3,350,165
METHOD OF REMOVING SULPHUR
DIOXIDE FROM GASES
Henri G. L. Marcheguet, Amfreville-la-Mi-Voie, and Louis Gandon, Petit Quevilly, France, assignors to Nobel-Bozel, Paris, France, a company of France
No Drawing. Filed Oct. 30, 1963, Ser. No. 319,964
Claims priority, application France, Jan. 18, 1963, 921,927
7 Claims. (Cl. 23—2)

ABSTRACT OF THE DISCLOSURE

Aqueous glyoxylic acid is employed to selectively absorb sulphur dioxide, and the absorbent is regenerated by heating to drive off the sulphur dioxide.

---

Numerous absorbents, especially in the form of aqueous solutions, have been proposed for the selective retention of sulphur dioxide contained in industrial gases. Independently of their absorption capacity, which varies with their nature, they all have the disadvantage of giving rise, through oxidation of the retained sulphur dioxide, to the formation of sulphuric acid which must be removed periodically. A loss of the absorbent inevitably occurs in these circumstances.

The formation of sulphuric acid, it is true, is very slow when the absorbent is glyoxal, as described in U.S. Patent No. 2,994,585; nevertheless it is not negligible.

We have now found that glyoxylic acid is a good absorbent for sulphur dioxide and, surprisingly, that it is not possible to detect the formation of sulphuric acid following repeated absorptions and desorptions by means of this compound.

It appears as if the glyoxylic acid performs, in addition to its absorbent role, the role of an oxidation inhibitor with respect to the sulphur dioxide.

The mechanism by which glyoxylic acid retains sulphur dioxide remains somewhat obscure. This aldehydic acid forms a metastable compound with sulphur dioxide, namely hydroxy-carboxy-methane-sulphonic acid, according to the following reaction equilibrium:

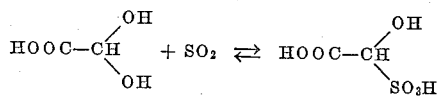

The glyoxylic acid should therefore retain only one molecule of sulphur dioxide, that is to say 100 g. of glyoxylic acid should retain 86.4 g. of sulphur dioxide.

The study of the variation of the absorption capacity as a function of the glyoxylic acid concentration of the aqueous solution has led to the results set out in Table I below, which gives the equilibrium concentrations of 100% sulphur dioxide at 20° C., for 15%, 30%, 40% and 50% by weight solutions of glyoxylic acid.

TABLE I

| Concentration of HOOC—CHO | | Concentration of sulphur dioxide at 20° C. | |
|---|---|---|---|
| Percent | G./litre | G./litre | Mol SO₂/mol of pure acid |
| 15 | 157.5 | 260 | 1.9 |
| 30 | 330 | 400 | 1.4 |
| 40 | 548 | 445 | 0.95 |
| 50 | 825 | 450 | 0.68 |

It will thus be seen that the relatively dilute solutions retain more sulphur dioxide than theoretical considerations would lead one to expect. On the other hand, beyond a limiting concentration, the absorption coefficient falls rather rapidly. This limit is about 40% of glyoxylic acid, so that the formation of hydroxy-carboxymethanesulphonic acid does not provide a complete explanation of the mechanism.

A particular advantage of the employment of an aqueous solution of glyoxylic acid as absorption agent is that sulphuric acid cannot be detected in this solution after repeated cycles of absorption and desorption. Moreover, the solution remains perfectly clear and colourless and its strength remains constant.

Glyoxylic acid is available, commercially, in the form of a crystalline monohydrate

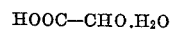

or perhaps

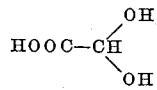

which melts at 58° C., is soluble in water in all proportions and has the great advantage that its volatility is practically nil.

Preferably it is employed in the form of an aqueous solution having a concentration of from 1 to 60% by weight, the optimum concentrations being from 20 to 50%, more especially about 40%.

The sulphur dioxide to be extracted from a gaseous mixture may have any concentration whatsoever between 0 and 100%. It can be accompanied by any other neutral or acid gas, for example carbon dioxide or hydrogen chloride, which passes through the solution without being retained and without interfering with the absorption of sulphur dioxide.

The absorption may be carried out at any temperature between 0° and 50° C. However, since increasing viscosity retards the absorption, there is advantage, in practice, in not using a temperature below 15° C. On the other hand, since the absorption capacity is an inverse function of the temperature, there is advantage in limiting the latter to the range of 20° to 25° C.

The formation of the sulphonic acid compounds is accompanied by a liberation of heat equal to 20,300 cal. per molecule of sulphur dioxide in the 40% acid at 20° C. It is therefore necessary to effect cooling in order to maintain the temperature in the optimum range of 20° to 25° C.

According to the type of absorber and the sulphur dioxide concentration of the gases, the absorption is continued up to a value more or less close to the equilibrium concentration so much the longer when the gases are more dilute.

The desorption is then carried out by raising the aqueous solution to a temperature higher than the absorption temperature. With a view to achieving maximum capacity in minimum time, there is advantage in heating to from 75° to 90° C. Preferably, boiling should be avoided in order to limit the evaporation of water and the resulting heat expenditure. Likewise, it is preferable not to try to continue the desorption up to total exhaustion of the sulphur dioxide from the solution.

The absorption and desorption apparatus may be arranged in such a way that the successive cycles may be effected continuously. A heat exchange may also be arranged in such a way that the heat of absorption forms a substantial balance of the heat energy necessary for the desorption.

When the sulphur dioxide is intended to be employed in a chemical reaction where the sole requirement is that it is not accompanied by a reactive gas, the desorption may be accelerated by scavenging by means of a gas which is neutral under the conditions of the reaction, for example nitrogen.

The invention will now be illustrated by the following non-limitative examples, in which percentages are by weight.

*Example 1*

250 ml. of a 40% solution (508 g./litre) of glyoxylic acid (density 1.270) is introduced into a bubbler having a capacity of 500 ccs., and a glass frit of 41.8 square cm. area.

A current of a gas formed by a mixture of air and sulphur dioxide in variable proportions is passed therethrough.

The bubbler is provided with an internal coil which, by cooling, enables the temperature to be maintained at 18° ±2° C.

The flow of gas, controlled by a calibrated flow-meter, can be varied between 25 and 150 litres per hour.

The quantity of sulphur dioxide absorbed is determined by weighing. The non-retained sulphur dioxide is determined by neutralisation in sodium carbonate solution in two bubblers in series.

In the following Table II there are set out the periods of absorption of 50 and 100 g. of sulphur dioxide in 250 ml. of the glyoxylic acid solution for the given flows and concentrations. There is indicated, where it could be detected, the "leakage point," i.e., the moment at which $SO_2$ commences to appear at the outlet of the acid absorber.

It should be noted that a concentration of 100 g. per 250 ml. of solution of the acid or 400 g./l. corresponds to 90% of the maximum concentration.

TABLE II

| Gas flow, l./hour | SO₂, Percent | Time for absorption of 50 g. | Time for absorption of 100 g. | Leakage point | |
|---|---|---|---|---|---|
| | | | | Time | Sulphur dioxide content, g./250 ml. |
| 24 | 18 | 4 h. | 11 h. | 4 h., 15 | 53.5 |
| 50 | 100 | 20 min. | 1 h., 30 | 30 min. | 70 |
| 50 | 19.3 | 2 h. | 8 h. | -------- | -------- |
| 50 | 9.6 | 4 h. | 30 h. | 1 h., 30 | 19 |
| 50 | 4.9 | 8 h. | 48 h. | 2 h., 30 | 20 |
| 100 | 100 | 15 min. | 1 h., 30 | -------- | -------- |
| 100 | 19.4 | 1 h., 15 | 11 h. | -------- | -------- |
| 100 | 10.8 | 2 h., 15 | 16 h., 30 | -------- | -------- |
| 100 | 4.5 | 5 h., 45 | 31 h. | 1 h. | 12.5 |
| 100 | 0.8 | 22 h., 30 | 75 h. | 19 h. | 42.5 |
| 150 | 100 | 15 min. | 1 h. | -------- | -------- |
| 150 | 20.2 | 1 h. | 9 h., 45 | -------- | -------- |
| 150 | 9.7 | 1 h., 45 | 15 h., 30 | 30 min. | 20 |
| 150 | 5.1 | 3 h., 15 | 21 h., 15 | -------- | -------- |
| 150 | 1.06 | 15 h. | 53 h. | 7 h., 45 | 34 |

*Example 2*

A series of absorptions and desorptions were carried out in the same apparatus as in Example 1.

A gas containing 9.7% of sulphur dioxide is passed for 4 hours at the rate of 150 l./hour. The solution contains 65 g. of sulphur dioxide which is liberated by heating to 85° C. under slightly reduced pressure. At the end of 2 hours, the solution contains only 22 g. of sulphur dioxide. The operation is repeated 30 times. At the end of the series, the glyoxylic acid has undergone no change, either in appearance or strength. The presence of sulphuric acid cannot be detected.

What we claim is:

1. A process for the extraction of sulphur dioxide from gas which contains it, which comprises contacting the gas with an aqueous solution of glyoxylic acid to absorb sulphur dioxide in said aqueous solution.

2. The process claimed in claim 1, in which the gas is brought into contact with the aqueous solution of the glyoxylic acid at a temperature between 0° and 50° C., and then the solution charged with sulphur dioxide is heated to a temperature above 50° C. to desorb sulphur dioxide.

3. The process claimed in claim 2, in which the gas is brought into contact with the glyoxylic acid solution at a temperature between 15° and 25° C.

4. The process claimed in claim 2, in which the solution charged with sulphur dioxide is heated to a temperature of from 75° to 90° C.

5. The process claimed in claim 1, in which the concentration of glyoxylic acid in the aqueous solution is from 1 to 60% by weight.

6. The process claimed in claim 5, in which the concentration of glyoxylic acid in the aqueous solution is from 20 to 50% by weight.

7. A process for the extraction of sulphur dioxide from gas which contains it, which comprises contacting the sulphur dioxide-containing gas with an aqueous solution of glyoxylic acid having a concentration of from 20 to 50% by weight and a temperature between 15° and 25° C., to absorb sulphur dioxide in said solution, and then the solution charged with sulphur dioxide is heated to a temperature of from 75° to 90° C.

References Cited

UNITED STATES PATENTS 2,994,585  8/1961  Marcheguet _____ 23—178

OTHER REFERENCES

Richter: "Organic Chemistry," volume I, Chemistry of the Aliphatic Series, P. Blakiston's Sons and Co., Philadelphia, Pa., 1922, pp. 207 and 401.

EARL C. THOMAS, *Primary Examiner.*